N. RATCHFORD.
RESILIENT WHEEL.
APPLICATION FILED AUG. 1, 1918.
1,335,752.
Patented Apr. 6, 1920.
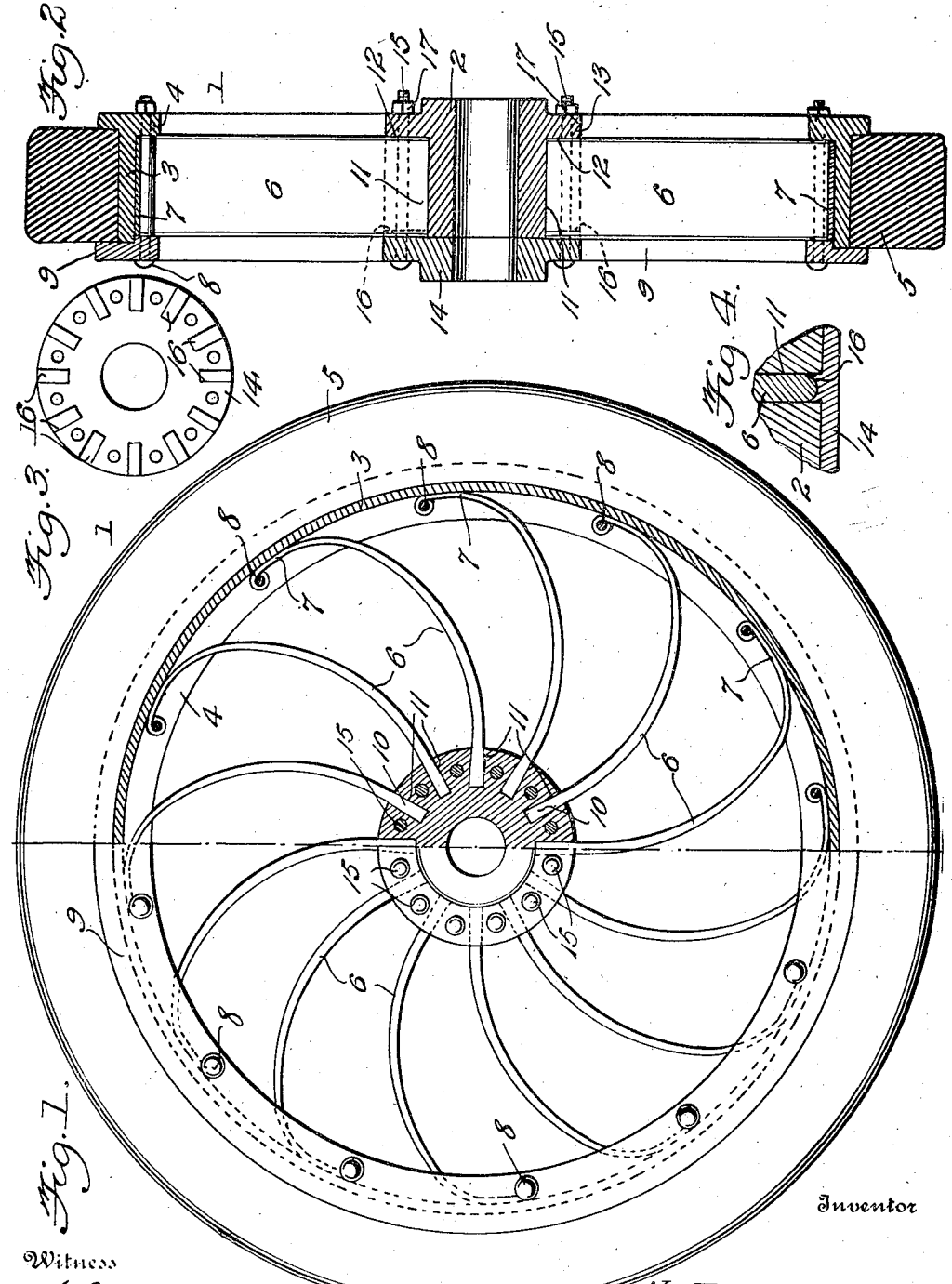

UNITED STATES PATENT OFFICE.

NICHOLAS RATCHFORD, OF SARATOGA, INDIANA.

RESILIENT WHEEL.

1,335,752.  Specification of Letters Patent.  Patented Apr. 6, 1920.

Application filed August 1, 1918. Serial No. 247,718.

*To all whom it may concern:*

Be it known that I, NICHOLAS RATCHFORD, a citizen of the United States, residing at Saratoga, in the county of Randolph and State of Indiana, have invented certain new and useful Improvements in Resilient Wheels, of which the following is a specification.

This invention relates to an improvement in resilient vehicle wheels, and is particularly directed for use in connection with motor vehicles, the object being to provide a wheel which will be sufficiently rigid to withstand all necessary stresses and strains and to be provided with a resilient spoke structure of novel construction and operation, which structure being so designed as to destroy or minimize the jolts or jars caused by the passage of a wheel over obstacles or rough and uneven surfaces, and said spoke structure being further constructed so that such jars and strains will be mainly absorbed in the wheel itself, instead of transmitting the same to the ordinary springs or body of the vehicle.

Another object of the invention resides in a resilient wheel wherein is provided a plurality of circularly disposed resilient spokes, which are interposed between the hub of the wheel and the rim thereof, which springs having their inner ends rigidly clamped to the hub structure and their outer ends flexed or bowed to engage with the inner surfaces of the rim, whereby when the spokes are placed under tension, their thrust will be directly imparted to the rim and not to the connecting elements employed for fastening the outer ends of the spokes to the rim.

A further object resides in the use of the above mentioned spokes which are in the form of vertically curved and transversely flat leaf springs, and which taper outwardly to provide relatively thick hub engaging portions and substantially thin rim engaging extremites, whereby said spokes will possess a desired degree of rigidity at their connected inner extremities and at the same time to possess proper resiliency at their points of connection with the wheel rim, thus providing a wheel combining marked strength in combination with unusual elasticity and springlike responsiveness.

A further important object of the invention resides in providing substantial and positive means for firmly uniting the inner ends of the spokes, whereby the hub of the wheel is formed with a plurality of radially disposed substantially wedge shaped recesses, which latter being adapted to receive the similarly shaped inner extremities of the spokes, this wedge connection between the spokes and hub serving to prevent radial separation or movement on part of said spokes from their coöperative positions within the hub, and a cap plate being bolted to the hub so as to cover the open ends of the wedge shaped recesses, and said cap plate serving to prevent lateral movement on part of said spokes as regards the hub structure.

With these and other objects in view, as will appear as the description proceeds, the invention accordingly consists in the novel features of construction, combination of elements, and arrangement of parts hereinafter fully described and having the scope thereof defined by the appended claim.

In the accompanying drawing, forming a part of this specification, and in which similar characters of reference denote like and corresponding parts throughout all the views thereof:

Figure 1 is a combined side elevation and vertical section of a resilient wheel comprising the preferred form of the present invention.

Fig. 2 is a vertical transverse sectional view taken through the wheel.

Fig. 3 is an elevation looking toward the inner side of the face plate.

Fig. 4 is an enlarged horizontal sectional view disclosing more particularly the coöperation between the ribs of the face plate and the edges of the spoke members.

In the embodiment illustrated, a wheel 1 is shown to comprise a centrally situated hub structure 2 and a circularly spaced annular rim 3. The rim in this instance is provided on one side with an annular flange 4, which is adapted to assist in retaining upon the wheel a solid rubber tire member 5. It will of course be appreciated that any other form of tire member may be substituted for the type shown, or any other suitable manner of connecting the tire member with the rim may be employed in lieu of that shown.

Interposed between the hub structure and the rim are a plurality of circularly arranged spoke members 6. These members are preferably formed from metal and are in the nature of flat leaf springs, whereby the same may be bent or flexed to assume the contour or substantially the contour disclosed in Fig. 1. It will be noted that the spring or spoke members taper outwardly, that is the inner ends of said members are of greater thickness than the coöperative rim engaging ends thereof, this construction enables the spoke members to possess desirable rigidity and strength adjacent to their points of connection with the hub structure, and to also possess maximum resiliency at their free or outer ends. This renders the wheel 1 substantial in construction and at once yieldable to jars and jolts. The outer ends 7 of the spoke members are formed to engage with the inner circular surface of the rim 3, so that the thrust exerted by the spring will be imparted to the rim and not to the transversely extending bolts 8, which pass through the rim and through the eye shaped end of the spoke members. These bolts are also employed to fasten a removable ring 9 to the rim 3, which ring is employed to engage the tire member 5 so as to hold the latter in its operative position upon said rim, or to permit of its convenient removal therefrom. Again, owing to the thrust exerted by the flexed spoke members, vibration or chattering between the bolts 8 and the ends 6 of the spoke members is prevented, thus rendering the wheel substantially silent in operation.

By tapering the spokes longitudinally, the inner ends of the latter are substantially wedge shaped, as indicated at 10, this formation is of value in rigidly uniting said members with the hub structure 2. To this end, said hub structure is formed with a plurality of radially extending, substantially wedge shaped sockets 11, which are formed with closed end walls 12 and with oppositely disposed open sides, said sockets of course, being open to the outer periphery of the hub structure, this permits the ends 10 of the spoke members to be laterally inserted into the sockets 11 until the same contact with the end walls 12 of each socket. These end walls are provided by means of a circular flange 13 integrally formed with the hub structure. This flange 13 is subject to modification, since if the wheel 1 is to be employed in the capacity of a driving wheel upon a motor vehicle, said flange may be extended to provide a brake ring (not shown), however, the wheel disclosed is used in the capacity of a steering wheel. It will be observed that owing to the wedge shaped formation of the spoke ends 10 and the sockets 11, the radial separation of said spoke members from their normal operative positions will be effectively prevented, but by driving the spoke members into said sockets, a firm and substantial connection will be provided, and one wherein loose connections will be precluded. To further lock the spoke members in position, use is made of a cap plate 14, which is secured to the hub structure by means of a plurality of transversely extending bolts 15, which pass through registering openings formed in said hub structure and said plate. This plate is adapted to overlie the open end of the sockets 11, so that lateral separation of the spokes from engagement with the hub structure will be prevented when the cap plate is in position. This palte is further formed with a plurality of radially arranged ribs 16, which are adapted, as shown in Fig. 4, to enter the open end of the socket 11 so as to frictionally engage with the curved edges of the spoke extremities 10, thus when the bolts 15 are firmly drawn into position, by means of the threaded nuts 17, said ribs will be forced into the sockets 11 and will be brought into firm frictional relation with said spoke members. This construction provides an exceedingly substantial and simple manner for properly retaining the spoke members in their operative positions, prevents slipping of said members and also avoids undue looseness or play at their points of connection with the hub structure.

From the foregoing it will be seen that there is provided a resilient wheel of considerable utility, and one which may be economically, substantially and reliably constructed so as to be capable of imparting extended service. The spoke members are so mounted in the wheel, that in the event of any one of the same breaking, the damaged member may be readily removed from the wheel and a new one substituted in lieu thereof. The construction of the wheel is such that the same may be successfully employed either in the capacity of a driving or a driven wheel, and will impart equally satisfactory service in either capacity.

The construction of the wheel is such that in applying weight to the axle thereof, the hub will be forced, by the action of this weight, on the running side of the normal line of gravity, and below a horizontal center line. Thus causing the weight to be exerted on the tire in advance of the normal line of gravity so as to result in the saving of power. Again, the fastening of the spokes 6 is such that to add weight on the car, with which the wheel is associated, will cause the spoke or spokes to press against the rim at positions farther from the fastening points 8 thereof, thus increasing the length of the fulcrum afforded by that portion of the springs resting in engagement with the rim 3, so as to proportionably stiffen the springs to conform with the weight carried. Furthermore, owing to the bowed construction of the springs, the sudden application of power to the wheel will result in a certain amount of give or play before the wheel actually starts to rotate.

This results in preventing the slipping of tires on the ground, so as to save wear thereof, and also absorbs shock to the car.

I claim:

In a spring wheel construction, a hub, a plurality of arcuate spring spokes which taper from their inner ends outwardly, means for rigidly clamping the inner ends of the spokes within the hub, a channeled rim of U shape in cross section comprising continuous side walls and a connecting transverse portion and means for pivoting the outer ends of the spokes within said channeled rim substantially at the juncture of said side walls and said transverse portion so that the outer faces of the spokes will contact with the inner face of said transverse portion through increasing portions of their length and the edges of the spokes along and adjacent said contacting portions move in between the side walls of the U shaped rim as load is brought upon the wheel and the springs are flexed, whereby the effective lengths of the springs are shortened and the spokes are braced against lateral movement to simultaneously increase the strength and rigidity of the springs and to brace them against lateral movement to an extent proportionate to the load upon the wheel.

In testimony whereof I affix my signature.

NICHOLAS RATCHFORD.